United States Patent

Virmani et al.

(10) Patent No.: US 8,300,362 B2
(45) Date of Patent: Oct. 30, 2012

(54) SLIDER-GIMBAL SCRATCH MITIGATION

(75) Inventors: Manish Virmani, Eden Prairie, MN (US); Paritosh Chandrakant Panchal, Bloomington, MN (US); James Fisher, Chaska, MN (US); Keefe Michael Russell, Robbinsdale, MN (US); Sandeepan Bhattacharya, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 615 days.

(21) Appl. No.: 12/484,816

(22) Filed: Jun. 15, 2009

(65) Prior Publication Data

US 2010/0315744 A1 Dec. 16, 2010

(51) Int. Cl.
G11B 5/48 (2006.01)

(52) U.S. Cl. .................................. 360/245.3; 360/245.7

(58) Field of Classification Search ................. 360/245, 360/245.1–245.4, 245.7
See application file for complete search history.

(56) References Cited

U.S. PATENT DOCUMENTS

| | | | |
|---|---|---|---|
| 5,107,383 A | 4/1992 | Takeuchi et al. | |
| 5,367,419 A | 11/1994 | Kazama | |
| 5,452,158 A | 9/1995 | Harrison et al. | |
| 5,467,236 A | 11/1995 | Hatanai et al. | |
| 5,781,378 A | 7/1998 | Heitkamp et al. | |
| 6,052,258 A * | 4/2000 | Albrecht et al. | 360/245.2 |
| 6,191,915 B1 | 2/2001 | Takagi et al. | |
| 6,266,212 B1 * | 7/2001 | Coon | 360/234.5 |
| 6,307,719 B1 | 10/2001 | Mallary | |
| 6,426,851 B1 | 7/2002 | Perez | |
| 6,483,670 B1 | 11/2002 | Watanabe | |
| 6,587,311 B1 | 7/2003 | Niijima et al. | |
| 6,671,131 B2 | 12/2003 | Kasajima et al. | |
| 6,744,602 B2 | 6/2004 | Rao et al. | |
| 6,801,400 B2 | 10/2004 | Fu et al. | |
| 6,950,288 B2 * | 9/2005 | Yao et al. | 360/294.4 |
| 6,993,824 B2 * | 2/2006 | Childers et al. | 29/603.03 |
| 7,046,483 B2 * | 5/2006 | Erpelding | 360/245.3 |
| 7,057,857 B1 * | 6/2006 | Niu et al. | 360/245.4 |
| 7,095,590 B2 * | 8/2006 | Motonishi et al. | 360/234.6 |
| 7,130,157 B2 | 10/2006 | Sassine et al. | |
| 7,283,332 B2 | 10/2007 | Weber | |
| 7,317,595 B2 * | 1/2008 | Tsuchida et al. | 360/245.3 |
| 7,480,120 B2 * | 1/2009 | Huang et al. | 360/245.3 |
| 7,551,386 B2 * | 6/2009 | Yao et al. | 360/75 |
| 7,567,410 B1 * | 7/2009 | Zhang et al. | 360/245.9 |
| 7,606,002 B1 * | 10/2009 | Berscheit et al. | 360/245.1 |
| 7,701,673 B2 * | 4/2010 | Wang et al. | 360/245.3 |
| 7,830,638 B1 * | 11/2010 | Jiang et al. | 360/234.5 |
| 7,907,368 B2 * | 3/2011 | Zeng et al. | 360/245.3 |
| 8,027,127 B2 * | 9/2011 | Zeng et al. | 360/245 |
| 8,054,585 B2 * | 11/2011 | Zeng et al. | 360/245.3 |
| 2002/0051323 A1 * | 5/2002 | Rancour et al. | 360/245.3 |
| 2005/0099733 A1 | 5/2005 | Hagen | |
| 2006/0050441 A1 | 3/2006 | Kang | |
| 2006/0274451 A1 | 12/2006 | Arya | |
| 2006/0274452 A1 | 12/2006 | Arya | |

(Continued)

*Primary Examiner* — Brian Miller
(74) *Attorney, Agent, or Firm* — Kagan Binder, PLLC

(57) ABSTRACT

A head gimbal assembly for use with a load beam includes a gimbal, a slider for carrying a transducing head, and first and second tabs. The gimbal is configured to be supported by the load beam, and includes a gimbal tongue. At least a portion of the slider is secured to the gimbal tongue. The first tab extends from the gimbal tongue proximate a first corner of the slider. The second tab is spaced from the first tab and extends from the gimbal tongue proximate a second corner of the slider.

18 Claims, 5 Drawing Sheets

U.S. PATENT DOCUMENTS

| | | |
|---|---|---|
| 2007/0159726 A1 | 7/2007 | Maslov et al. |
| 2007/0206328 A1 | 9/2007 | Hagen |
| 2007/0263325 A1 | 11/2007 | Hanya et al. |
| 2008/0030900 A1* | 2/2008 | Zeng et al. .................. 360/234.5 |
| 2008/0144225 A1* | 6/2008 | Yao et al. .................... 360/294.4 |
| 2010/0315745 A1 | 12/2010 | Virmani et al. |

* cited by examiner

SLIDER-GIMBAL SCRATCH MITIGATION

BACKGROUND

Hard disc drives (HDDs) typically comprise one or more magnetic media discs or other magnetic storage media, each having concentric data tracks for storing data. Where multiple discs are used, a stack is formed of co-axial discs having generally the same diameter. A transducing head carried by a slider is used to read from and write to a data track on a given disc. The slider is connected to a suspension assembly, which can include a load beam and a gimbal, and the suspension assembly is in turn attached to an actuator arm. The load beam is generally made of a metallic material, typically stainless steel. The gimbal can be a separate metallic element secured to the load beam to support the slider thereon while permitting some movement of the slider, and can also be made of stainless steel. During operation, as the disc spins, the slider glides above the surface of the disc on a small cushion of air. The actuator arm pivots to movably position the slider with respect to the disc. A microactuator assembly can be included to provide additional precision positioning of the suspension assembly. Electrical connections extend along the suspension to electrically connect the transducing head to components located at or near the actuator arm. Those electrical connections can be formed on the suspension itself, or can be located on a separate interconnect structure supported relative to the suspension, such as a flex-on suspension (FOS).

Magnetic storage media can store data as bits with magnetization directions in-plane, or perpendicular to a plane of the media. Greater storage densities can generally be achieved with perpendicular recording.

The transducing head typically includes a writer and a reader. The reader includes a sensor for retrieving magnetically encoded information stored on the disc (or other magnetic storage medium). Magnetic flux from the surface of the disc causes rotation of the magnetization vector of a sensing layer or layers of the sensor, which in turn causes a change in the electrical properties of the sensor that can be detected by passing a current through the sensor and measuring a voltage across the sensor. Depending on the geometry of the sensor, the sense current may be passed in the plane (CIP) of the layers of the sensor or perpendicular to the plane (CPP) of the layers of the sensor. External circuitry then converts the voltage information into an appropriate format and manipulates that information as necessary to recover information encoded on the disc.

The writer, for a perpendicular recording transducing head, typically includes a main pole and a return pole, which are separated from each other at an air bearing surface (ABS) of the transducing head by a gap layer. The main pole and return pole can be connected to each other at a region distal from the ABS by a back gap closer or back via. One or more layers of conductive coils are positioned between the main and return poles, and are encapsulated by electrically insulating layers. The conductive coils can have different configurations, such as helical and pancake configurations. To write data to the disc (or other magnetic storage medium), an electric current is applied to the conductive coils to induce a magnetic field in the disc under a pole tip of the main pole. By reversing the direction of the current through the coils, the polarity of the data written to the magnetic storage medium is reversed, and a magnetic transition is written between two adjacent bits of the magnetic storage medium.

The slider includes a slider body (typically called the "substrate") and an overcoat that includes the transducing head. The slider body and the overcoat are typically made of a ceramic material. A plurality of bond pads are formed on the slider, such as at a trailing edge or top surface of the slider, for electrically connecting elements of the transducing head to external circuitry through the overcoat.

During fabrication and operation of a HDD, particles can be generated. The presence of particles in an HDD, particularly metallic particles, is undesirable, and can cause a decrease in HDD performance. One particular problem is that particles can accumulate on surfaces inside the HDD and later shed to the magnetic storage media, increasing a risk of unwanted magnetic erasures. Modern HDDs are much more sensitive to particles than previous-generation HDDs. While there are known solutions for capturing particles and limiting negative effects of particles present within HDDs, it is desirable to limit the creation of particles rather than merely redress the presence of particles already created.

SUMMARY

A head gimbal assembly according to the present invention for use with a load beam includes a gimbal, a slider for carrying a transducing head, and first and second tabs. The gimbal is configured to be supported by the load beam, and includes a gimbal tongue. At least a portion of the slider is secured to the gimbal tongue. The first tab extends from the gimbal tongue proximate a first corner of the slider. The second tab is spaced from the first tab and extends from the gimbal tongue proximate a second corner of the slider.

DETAILED DESCRIPTION

In general, the present invention provides features for a suspension assembly of a hard disc drive (HDD) to reduce a risk of particle generation. Unwanted particles in an HDD can be generated in many ways during fabrication and operation of the drive. For example, during head stack assembly of a HDD, a flexure of a gimbal can occur, causing the slider to contact the load beam. Shock to the HDD, whether operational or non-operational, can also produce such unwanted contact. Physical contact between a relatively hard ceramic material of the slider and the metallic material of the load beam often causes scratches in load beam, which can generate metallic particles. According to an embodiment of the present invention, a gimbal tongue can include a first tab located at or near a first corner of a slider and a second tab spaced from the first tab and located at or near a second corner of the slider. These tabs can help reduce a risk that the relatively hard material of the slider will contact the load beam, and thereby reduces a risk of particle generation.

Figure 1:
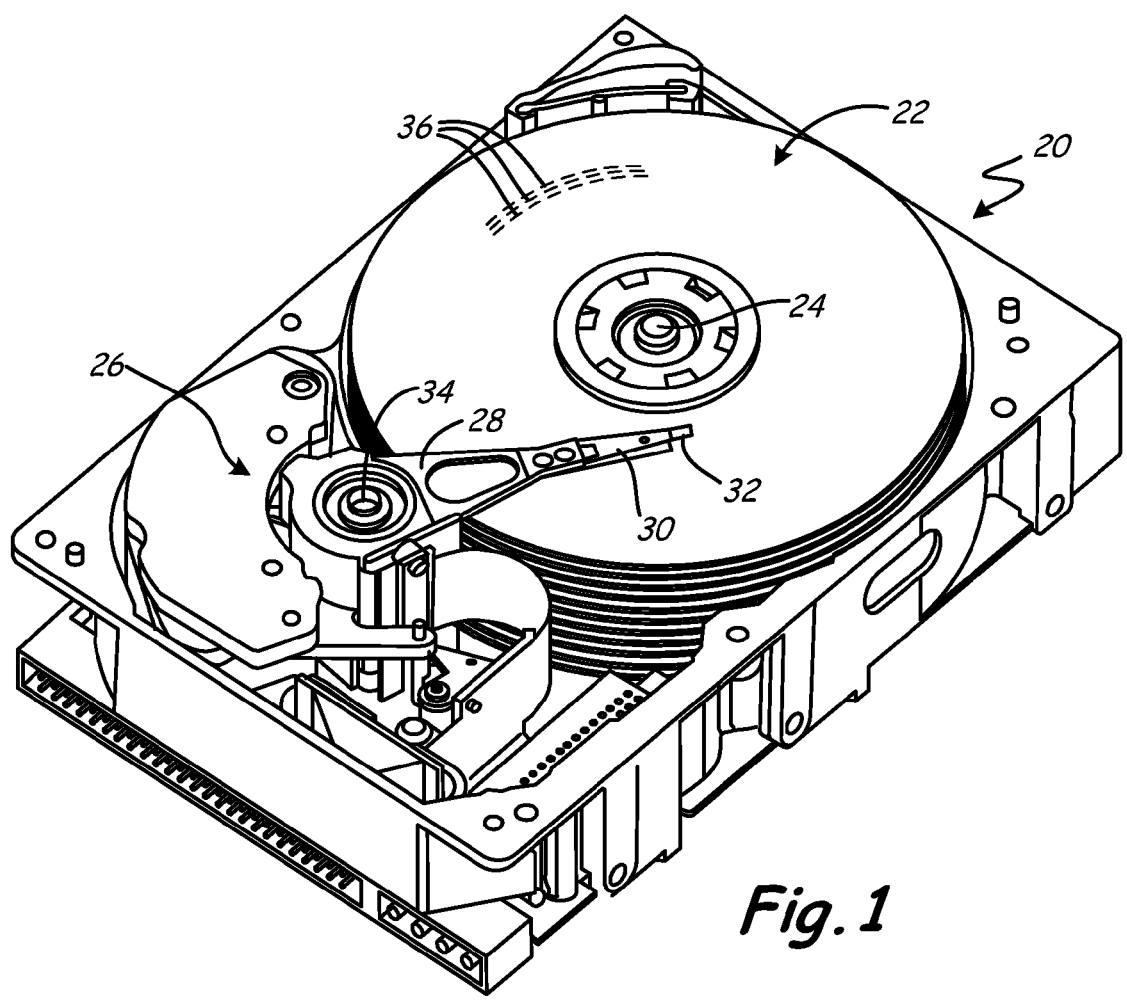
FIG. 1 is a perspective view of an example hard disc drive (HDD) system.

FIG. 1 is a perspective view of an exemplary HDD system 20 that includes a magnetic storage disc 22 configured to rotate about an axis 24, an actuation motor 26 (e.g., a voice coil motor), an actuator arm 28, a suspension assembly 30, and a slider 32 carrying a transducing head. The slider 32 is supported by the suspension assembly 30, which in turn is supported by the actuator arm 28. The actuation motor 26 is configured to pivot the actuator arm 28 about an axis 34. The transducing head carried by the slider 32 can be positioned relative to selected concentric data tracks 36 of the disc 22, for reading from and writing to the disc 22. It should be noted that one or more co-rotating discs 22 can be provided in the HDD system 20.

Figure 2:
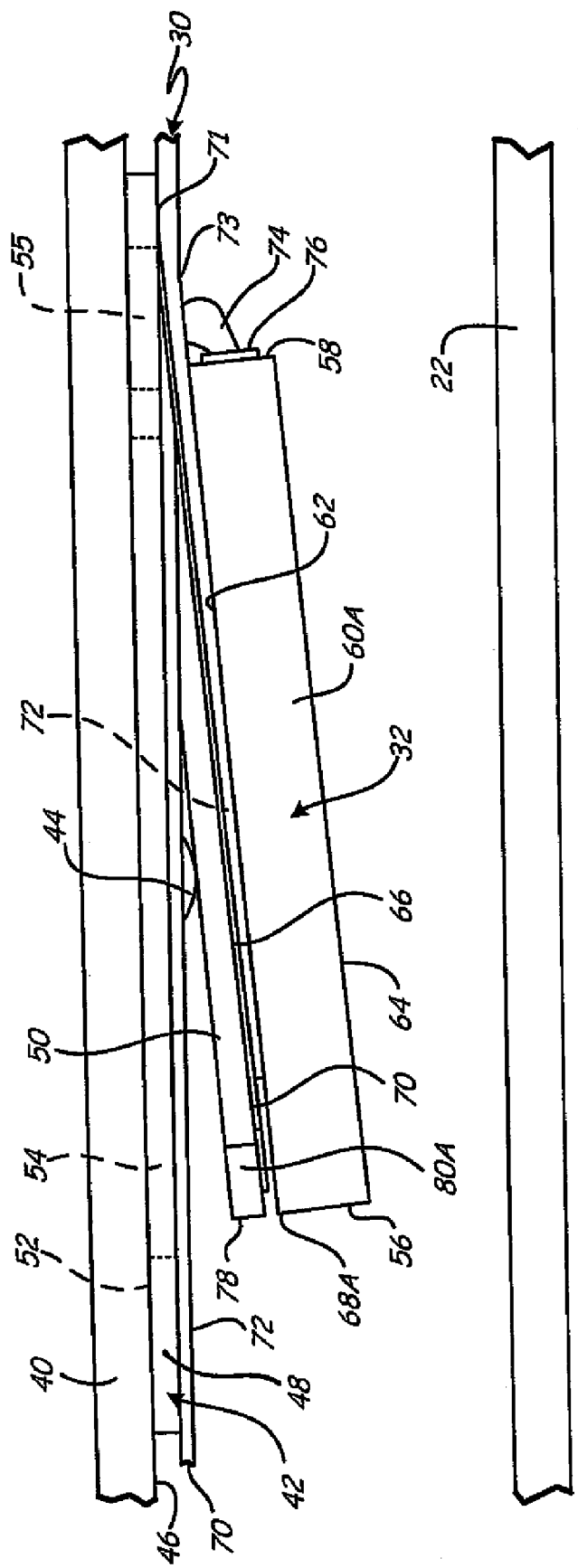
FIG. 2 is a side elevation view of a portion of one embodiment of a suspension assembly according to the present invention and a portion of a magnetic storage disc.
Figure 3:
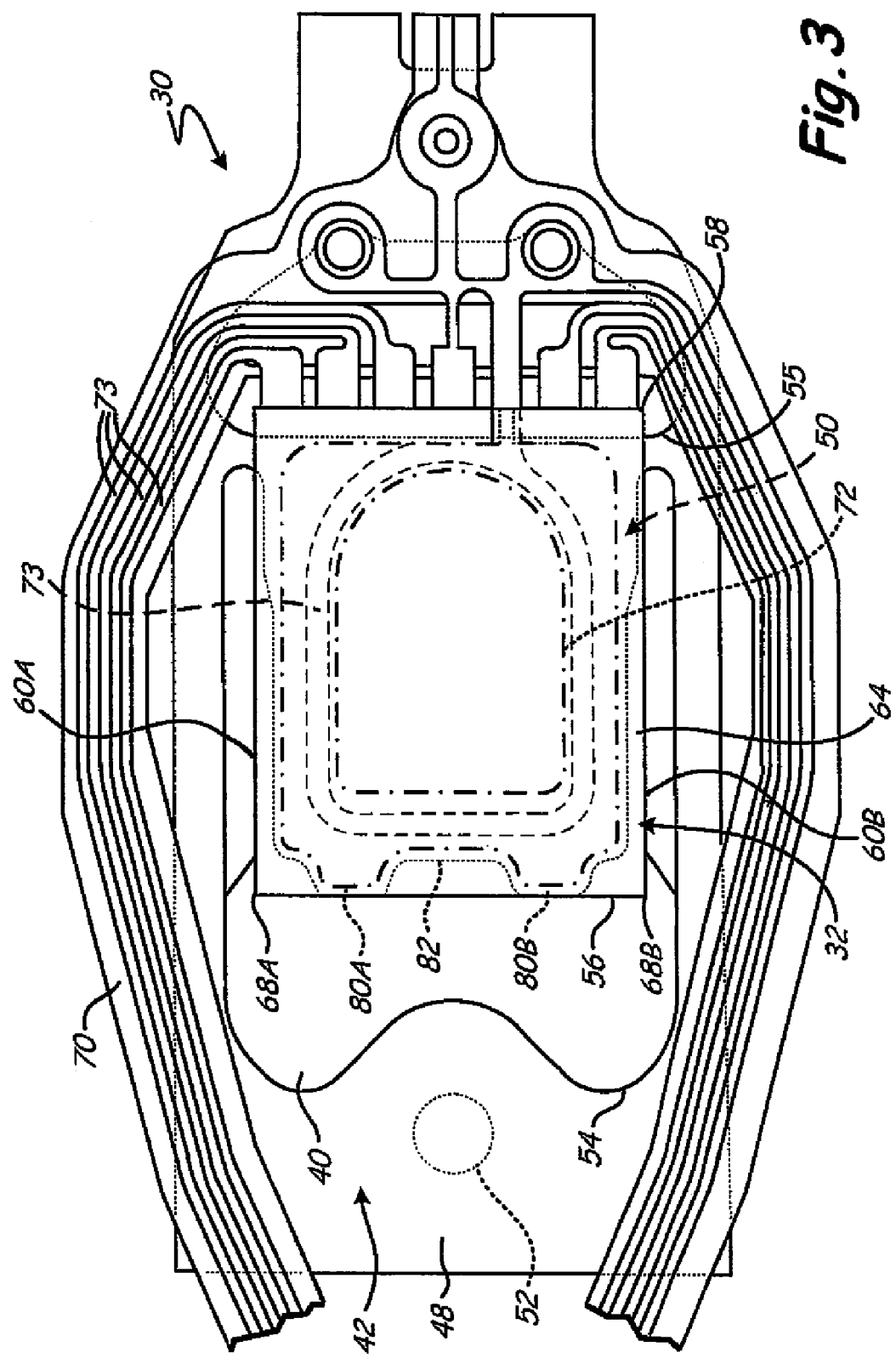
FIG. 3 is a bottom view of a portion of the suspension assembly of FIG. 2.

FIG. 2 is a side elevation view of a portion of one embodiment of the suspension assembly 30 along with a portion of the disc 22. FIG. 3 is a bottom, air bearing surface (ABS) view of the portion of the suspension assembly 30. It should be noted that the disc 22 is not shown in FIG. 3. The suspension 30 and the slider 32 are collectively referred to as a head gimbal assembly (HGA).

The suspension assembly 30 includes a load beam 40 and a gimbal 42. The load beam 40 is an elongate member with a generally convex load button 44 of a conventional configuration protruding from a first side 46 that faces the disc 22. The load beam 40 can have essentially any desired configuration, and can vary for particular applications. The load beam 40 of the illustrated embodiment comprises a metallic material, such as stainless steel.

The gimbal 42 includes a mounting portion 48 and a gimbal tongue portion 50. The mounting portion 48 of the gimbal 42 can be secured to the first side 46 of the load beam 40 with a weld 52. In alternative embodiments, the gimbal 42 can be secured to the load beam 40 with adhesive, or by other suitable means. The mounting portion 48 can be formed as a generally planar structure defining a first opening 54 in a generally central region of the mounting portion 48. The mounting portion 48 surrounds the gimbal tongue 50, which extends into the first opening 54 in a cantilevered configuration. A second opening 55 can also be formed in the mounting portion 48 of the gimbal 42. The gimbal tongue 50 can be integrally formed with the mounting portion 48. Typically, the gimbal 42 is formed from a single piece of sheet metal, such as with a stamping operation that can simultaneously form the mounting portion 48 and the gimbal tongue 50 from a single, continuous piece of material. The gimbal tongue 50 is able to resiliently flex relative to the mounting portion 48.

The slider 32 is generally shaped like a rectangular box and defines a leading edge 56 and an opposite trailing edge 58, a pair of opposite side edges 60A and 60B, and a top surface 62 and an opposite ABS 64. At least a portion of the slider 32, typically the top surface 62, is secured to a first side 66 of the gimbal tongue 50. The slider 32 can be attached to the gimbal tongue 50 with an adhesive or by other means. Flexure of the gimbal tongue 50 allows for pitch and roll movement of the slider 32. The slider 32 is made from a ceramic material, which is a relatively hard material.

When the gimbal 42 is attached to the load beam 40, the gimbal tongue 50 contacts and is biased against the load button 44. This contact with the load button 44 can deflect the gimbal tongue 50 relative to the mounting portion 48 in a direction away from the first surface 46 of the load beam 40. At least part of the mounting portion 48 may also be deflected due to biasing of the gimbal 42 against the load button 44, particularly at a location opposite the weld 52 near the trailing edge 58 of the slider. Biasing of the gimbal tongue 50 against the load button 44 helps promote desired positioning of the slider 32 relative to the disc 22 during operation of the HDD system 20. When the gimbal tongue 50 is deflected by the load button 44, a portion of the slider 32 at the trailing edge 58 can move into the second opening 55 in the mounting portion 48 of the gimbal 42.

In the illustrated embodiment, a polymer layer 70 is located on a first face 71 of the gimbal 42 facing the load beam 40 and opposite the disc 22. The polymer layer 70 can comprise a stand-alone flex circuit, or can be deposited upon components of the suspension assembly 30. In the illustrated embodiment, the polymer layer 70 extends over most of the gimbal tongue 50, though an opening 72 can be formed in the polymer layer 70 to allow adhesive to extend between the slider 32 and the gimbal tongue 50. The polymer layer 70 acts as an electrically insulative layer upon which electrically conductive traces 73 can be deposited, which are used to electrically connect the transducing head carried by the slider 32 to other components of the HDD system 20 in remote locations. The traces 73 can comprise a metallic material, such as copper. An electrically insulative overcoat or cover coat (not shown) can optionally be deposited over the top of the traces 73. In the illustrated embodiment, conventional solder connections 74 are shown between the traces 73 and pads 76 on the trailing edge 58 of the slider 32. At least one of the traces 73 extends along the polymer layer 70 between the gimbal tongue 50 and the top surface 62 of the slider 32 in the illustrated embodiment. In alternative embodiments, other traces 73 can continue along the polymer layer 70 between the gimbal tongue 50 and the top surface 62 of the slider 32 and some or all of the solder connections 74 can be relocated relative to the top surface 62 of the slider 32, such as in embodiments where the slider 32 includes top bond pads (e.g., those disclosed in commonly-assigned U.S. Pat. App. Pub. No. 2007/0274005 entitled "Top Bond Pad For Transducing Head Interconnect").

As best shown in FIG. 2, the gimbal tongue 50 has a distal end 78. The leading edge 56 of the slider 32 is located near the distal end 78 of the gimbal tongue 50. First and second tabs 80A and 80B, respectively, extend from the distal end 78 of the gimbal tongue 50. The first tab 80A is positioned proximate the first corner 68A of the slider 32, and the second tab 80B is positioned proximate the second corner 68B of the slider 32. A cutout channel 82 is defined between the first and second tabs 80A and 80B, creating a space between them. In the illustrated embodiment, each of the tabs 80A and 80B has a generally trapezoidal shape, with rounded corners, and is integrally formed with the gimbal tongue 50. The shape and orientation of the tabs 80A and 80B can be selected to reduce a possibility of sharp corners, sharp edges and sharp points contacting other materials, which can cause particle generation, and instead favor surface-to-surface contact, such as relatively parallel contact between planar surfaces. Also, in the illustrated embodiment, the polymer layer 70 extends along portions of each of the tabs 80A and 80B, but is recessed slightly from respective perimeters of the tabs 80A and 80B. In alternate embodiments, the polymer layer 70 need not extend along the tabs 80A and 80B. As illustrated in FIGS. 2 and 3, the tabs 80A and 80B are substantially aligned with the leading edge 56 of the slider 32. In further embodiments, it is possible for one or both of the tabs 80A and 80B to extend beyond the leading edge 56 of the slider 32 or to terminate short of the leading edge 56 of the sliders 32. Some small variation in alignment of the tabs 80A and 80B and the gimbal tongue 50 relative to the slider 32 is common from conventional pick-and-place equipment used during fabrication (e.g., on the order of about +/−0.02-0.03 mm).

The tabs 80A and 80B help to reduce a risk of particle generation, which can be especially problematic during assembly of the HDD 20 prior to operation. For instance, during assembly of the head stack assembly it is possible for movement of the gimbal tongue 50 and the slider 32 to occur, in a way that is less likely to occur during normal operation of the HDD system 20. With prior art suspensions, such movement often caused the relatively hard ceramic material of the slider to contact the metallic material of the load beam through an opening in the gimbal, leading to scratches on the load beam and the generation of metallic particles. However, the tabs 80A and 80B provide a barrier that reduces or eliminates contact between the ceramic material of the slider 32 and the metallic material of the load beam 40. Metal-on-metal contact between the tabs 80A and 80B and the load beam 40 is less likely to generate particles than ceramic-on-metal contact, because those metallic components generally have comparable hardness values. Furthermore, in embodiments where the polymer layer 70 extends along the tabs 80A and 80B, polymer-on-metal contact between the polymer layer 70 and the load beam 40 presents a relatively low risk of particle generation, and such contact would tend to only produce polymer particles, which are relatively soft and less likely to interfere with operation of the HDD system 20 than other types of particles.

The locations of the tabs 80A and 80B at or near the corners 68A and 68B, respectively, of the slider 32 also helps to reduce particle generation. The relatively sharp corners 68A and 68B of the slider 32 present a relatively high risk of particle generation if they contact the load beam 40, and that particular risk can be reduced through selective placement of the tabs 80A and 80B. In addition, the use of discrete, spaced apart tabs 80A and 80B, with the cutout channel 82 in between, can help to reduce a risk of particle accumulation, particularly in embodiments where the tabs 80A and 80B extend beyond the leading edge 56 of the slider 32. The cutout channel 82 acts like a vent to allow airflow and particle movement between the space tabs 80A and 80B to reduce a risk of a relatively slow-moving, high pressure airflow region developing at that location, which would tend to slow the movement of particles carried in an airflow and lead to undesirable particle accumulation.

Figure 4:
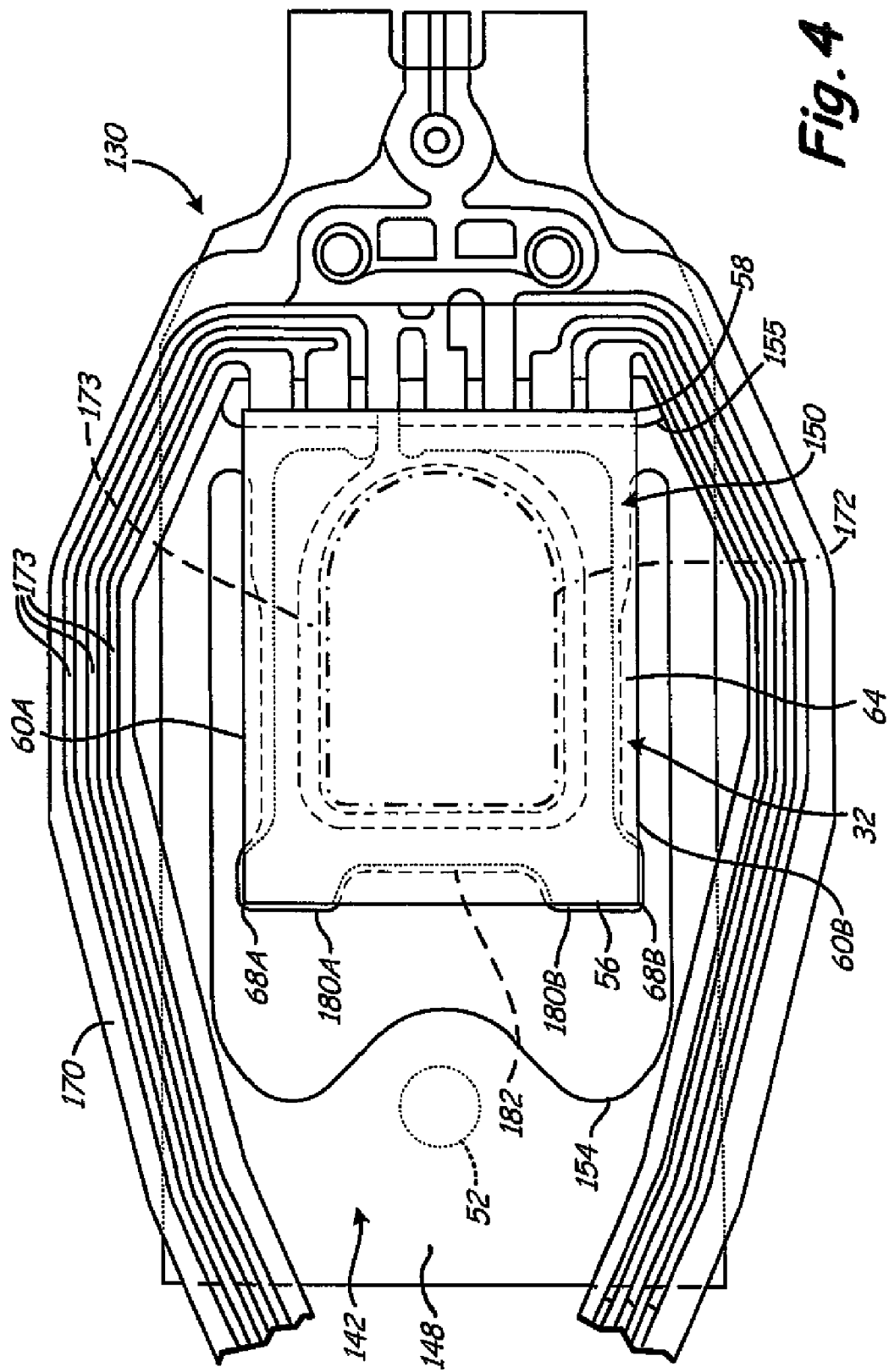
FIG. 4 is a bottom view of a portion of an embodiment of the suspension assembly according to the present invention.
Figure 5:
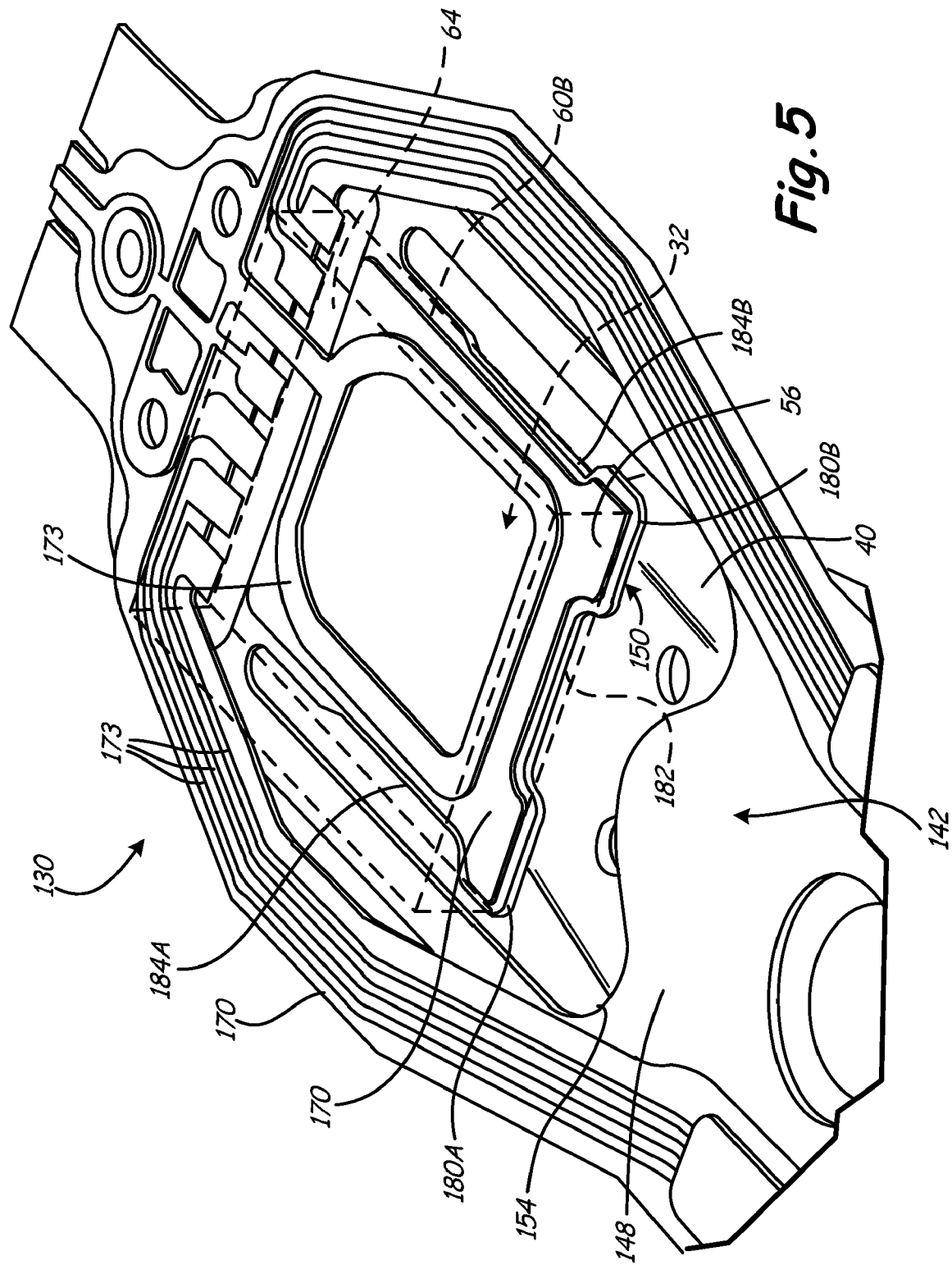
FIG. 5 is a perspective view of the portion of the embodiment of the suspension assembly of FIG. 4.

FIGS. 4 and 5 illustrate another embodiment of a suspension assembly 130. FIG. 4 is a bottom view of a portion of another embodiment of the suspension assembly 130, and FIG. 5 is a perspective view of the portion of the suspension assembly 130. The suspension assembly 130 is generally similar to the assembly 30 described above with respect to FIGS. 2 and 3, and similar components are designated by similar reference numbers with values increased by one hundred in FIGS. 4 and 5. As shown in FIGS. 4 and 5, the suspension assembly includes a gimbal 142 with a mounting portion 148 and a gimbal tongue 150.

First and second tabs 180A and 180B extend from a distal end 178 of the gimbal tongue 150, and can be integrally formed with the gimbal tongue 150. The first and second tabs 180A and 180B are positioned at the first and second corners 68A and 68B, respectively, of the slider 32. A cutout channel 182 is defined in the distal end 178 of the gimbal tongue 150 in between the tabs 180A and 180B. In addition, first and second side cutout channels 184A and 184B are formed in the gimbal tongue 150 proximate the side edges 60A and 60B, respectively, of the slider 32. In the illustrated embodiment, the tabs 180A and 180B extend beyond the leading edge 56 of the slider 32, while the cutout channel 182 is recessed from the leading edge 56 of the slider 32. The tabs 180A and 180B also extend beyond the side edges 60A and 60B, respectively, of the slider 32. A polymer layer 170 extends along at least a portion of the gimbal tongue 150. As illustrated, the polymer layer 170 extends along portions of each of the tabs 180A and 180B, and is recessed a small amount from a perimeter of the gimbal tongue 150 and the tabs 180A and 180B. The portion of the polymer layer 170 that extends along the tabs 180A and 180B can be aligned with the leading edge 56 of the slider 32.

The polymer layer 170 can include an opening 172 at a central portion of the gimbal tongue 150 to allow for attachment of the slider 32 to the gimbal tongue 150 through the opening 172.

It will be recognized that the present invention provides numerous benefits and advantages. For instance, the present invention provides a suitable balance between a number competing design parameters and operational conditions such as particle generation, particle accumulation, and manufacturing/assembly tolerances.

Although the present invention has been described with reference to preferred embodiments, workers skilled in the art will recognize that changes may be made in form and detail without departing from the spirit and scope of the invention. For example, the present invention can be used in conjunction with other particle collection and mitigation features as well as gimbal limiters. Moreover, gimbal tongue tabs according to the present invention can have nearly any shape and configuration, such as with tabs bent away from a load beam at a leading edge of a slider.

The invention claimed is:

1. A head gimbal assembly for use with a load beam, the assembly comprising:
   a gimbal configured to be supported by the load beam, wherein the gimbal includes a gimbal tongue and comprises a metallic layer;
   a slider for carrying a transducing head secured to the gimbal tongue;
   a first tab extending from the gimbal tongue proximate to but spaced laterally in from a first corner of the slider;
   a second tab spaced from the first tab and extending from the gimbal tongue proximate to but spaced laterally in from a second corner of the slider; and
   a polymer layer secured to the metallic layer of the gimbal, wherein the polymer layer extends along at least a portion of the first tab at a surface facing the load beam.

2. The assembly of claim 1, wherein a distal end of the first tab extends beyond a leading edge of the slider in a cantilevered configuration.

3. The assembly of claim 2, wherein a distal end of the second tab extends beyond a leading edge of the slider in a cantilevered configuration.

4. The assembly of claim 1 wherein the polymer layer extends along at least a portion of the second tab at a surface facing the load beam.

5. The assembly of claim 1 wherein the first and second tabs have a generally trapezoidal shape.

6. The assembly of claim 1 wherein the first and second tabs have rounded corners.

7. A head gimbal assembly comprising:
   a gimbal configured to be supported by a load beam, wherein the gimbal includes a gimbal tongue and comprises a metallic layer;
   a slider for carrying a transducing head secured to the gimbal tongue;
   a first tab extending from the gimbal tongue located near a first corner of the slider;
   a second tab extending from the gimbal tongue located near a second corner of the slider, the first tab and the second tab defining a cutout channel in the gimbal tongue extending inward from a distal end of the gimbal tongue; and
   a polymer layer secured to the metallic layer of the gimbal, wherein the polymer layer extends along at least a portion of the first tab at a surface facing the load beam.

8. The assembly of claim 7, wherein a distal end of the first tab extends beyond a leading edge of the slider in a cantilevered configuration.

9. The assembly of claim 8, wherein a distal end of the second tab extends beyond a leading edge of the slider in a cantilevered configuration.

10. The assembly of claim 7, wherein a leading edge portion of the slider extends beyond a distal end of the first tab.

11. The assembly of claim 10, wherein a leading edge portion of the slider extends beyond a distal end of the second tab.

12. The assembly of claim 7 wherein the polymer layer extends along at least a portion of the second tab at a surface facing the load beam.

13. The assembly of claim 7 wherein the first and second tabs have a generally trapezoidal shape.

14. The assembly of claim 7 wherein the first and second tabs have rounded corners.

15. A head gimbal assembly for use with a load beam, the assembly comprising:
- a gimbal configured to be supported by the load beam, the gimbal comprising a metallic layer and including a gimbal tongue;
- a slider for carrying a transducing head secured to the gimbal tongue;
- a first tab extending from the gimbal tongue proximate a first corner of the slider;
- a second tab spaced from the first tab and extending from the gimbal tongue proximate a second corner of the slider; and
- a polymer layer between the metallic layer of the gimbal and the slider, wherein the polymer layer extends along at least a portion of the first tab and along at least a portion of the second tab.

16. The assembly of claim 15 wherein the first tab and the second tab extend beyond a leading edge of the slider in a cantilevered configuration.

17. The assembly of claim 16 wherein the distal end of the first tab extends beyond a side edge of the slider adjacent to the leading edge of the slider.

18. The assembly of claim 15 wherein the polymer layer is aligned with a leading edge of the slider.

* * * * *